Figure 1:
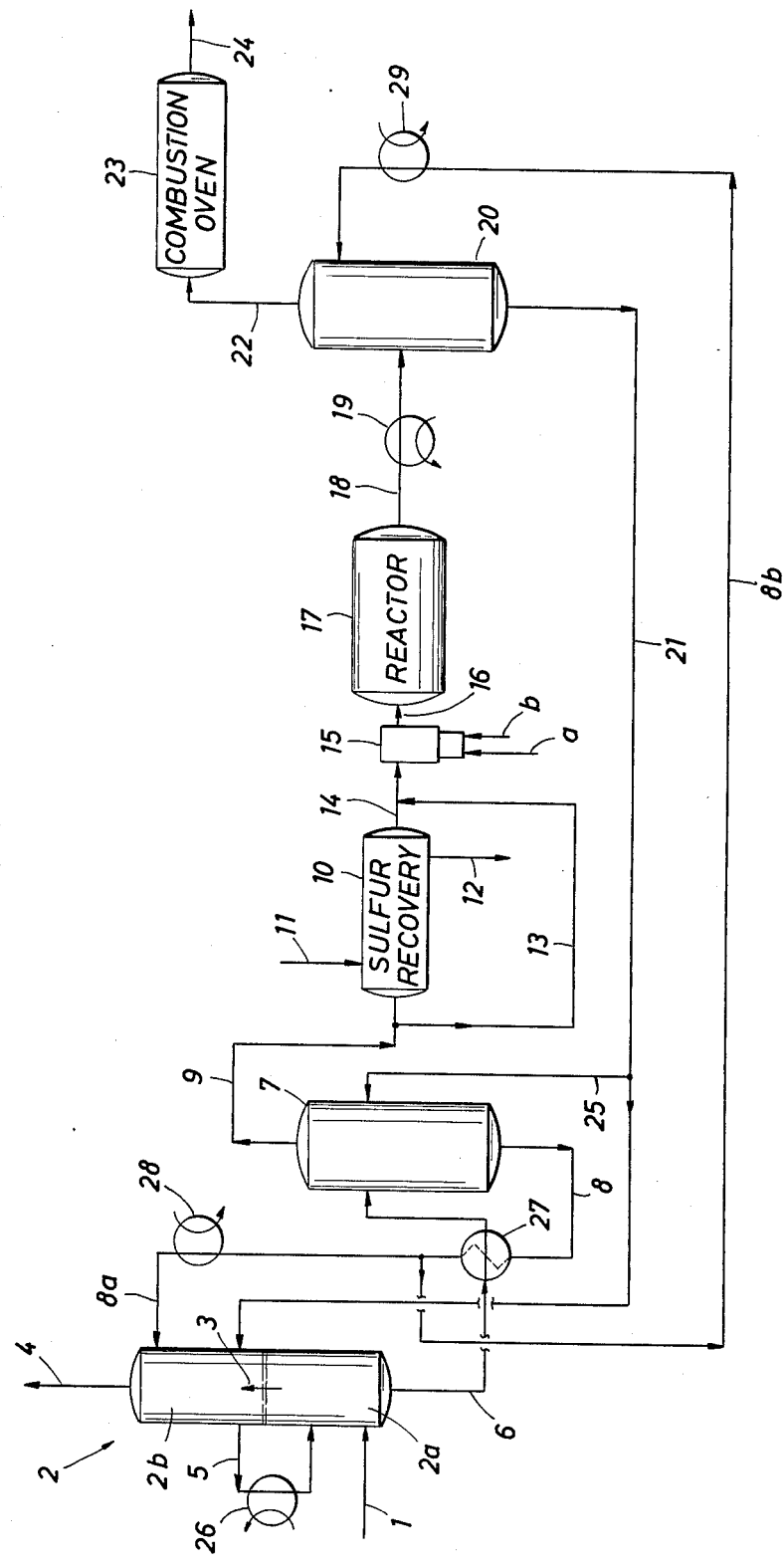

United States Patent [19] [11] 4,241,032
Werner et al. [45] Dec. 23, 1980

[54] PROCESS FOR THE REMOVAL OF HYDROGEN SULFIDE FROM GAS STREAMS

[75] Inventors: Erik S. E. Werner; Cornelis Ouwerkerk; Roelof Cornelisse, all of The Hague, Netherlands

[73] Assignee: Shell Oil Company, Houston, Tex.

[21] Appl. No.: 41,457

[22] Filed: May 22, 1979

[30] Foreign Application Priority Data

May 23, 1978 [NL] Netherlands ................... 7805550

[51] Int. Cl.³ ............................................. B01D 53/34
[52] U.S. Cl. .................................... 423/226; 423/228; 423/229; 423/564; 423/573 R; 423/574 L
[58] Field of Search ........... 423/226, 228, 229, 573 G, 423/573 R, 564, 574 L, 574 G

[56] References Cited

U.S. PATENT DOCUMENTS

| 4,001,386 | 1/1977 | Klein et al. | 423/574 L |
| 4,085,199 | 4/1978 | Singleton et al. | 423/574 R |
| 4,113,837 | 9/1978 | Kendall et al. | 423/228 X |
| 4,153,674 | 5/1979 | Verloop et al. | 423/573 R |

FOREIGN PATENT DOCUMENTS

| 1356289 | 6/1974 | United Kingdom . |
| 1461070 | 1/1977 | United Kingdom . |
| 1470950 | 4/1977 | United Kingdom . |

OTHER PUBLICATIONS

Harvey et al., "Experience Confirms the Adaptability of the SCOT (Shell Claus Off-gas Treating) Process," 2nd International Symposium on the Control of Gaseous Sulfur Compound Emission, Salford, Apr. 8, 1976.

Primary Examiner—Earl C. Thomas

[57] ABSTRACT

A process for the removal of hydrogen sulfide from a gas stream is described, the process being characterized by removal of organic sulfur compounds also present in the stream and by an improved solvent flow.

10 Claims, 2 Drawing Figures

U.S. Patent   Dec. 23, 1980   Sheet 2 of 2   4,241,032

PROCESS FOR THE REMOVAL OF HYDROGEN SULFIDE FROM GAS STREAMS

BACKGROUND OF THE INVENTION

In general, the feed for Claus plants consists of hydrogen sulfide-containing gases obtained during the regeneration step of gas purification processes. These gas purification processes, which are required in order to reduce the quantity of sulfur-containing components (in most cases, principally hydrogen sulfide) of industrial gases such as refinery gas, natural gas, or synthesis gas obtained by the partial combustion of hydrocarbons or coal to an acceptably low level before they are used further, generally comprise the absorption of the sulfur components from the gases into a liquid absorbent which is subsequently regenerated in order to obtain hydrogen sulfide-rich gases. The latter gases are then subsequently supplied to a Claus plant, elemental sulfur being obtained from the sulfur components. The off-gases from the Claus plant can then in turn be treated themselves also in order to reduce to a very low level the sulfur content of the gases ultimately discharged to the atmosphere.

A process for the reduction of the total sulfur content of the off-gases originating from Claus plants has already been proposed. In such a process, the off-gases are passed at a temperature higher than 175° C., together with a hydrogen and/or carbon monoxide-containing gas, over a sulfided catalyst of a metal of Group VI and/or Group VIII, which catalyst is supported on an inorganic oxide carrier, after which the thus treated off-gases are passed through a liquid and regenerable absorbent for hydrogen sulfide and the nonabsorbed portion of the off-gases, optionally after combustion, are discharged to the atmosphere while the hydrogen sulfide-enriched absorbent is regenerated and reused for further absorption of hydrogen sulfide and the hydrogen sulfide-rich gas mixture liberated during the regeneration is passed to a Claus plant. Preferably, the hydrogen sulfide-rich gas mixture liberated during the regeneration is recycled to the Clause plant whence the off-gases originated so that a closed process is obtained.

In addition to hydrogen sulfide, the industrial gases often also contain other sulfur compounds, such as carbonyl sulfide, mercaptans, and disulfides, which organic sulfur compounds must likewise be removed before the gases can be used. These industrial gases, however, as a rule also contain carbon dioxide. Liquid absorbents for the removal of hydrogen sulfide generally prove to be good absorbents for carbon dioxide as well. In practice, for the removal of an organic sulfur compound such as carbonyl sulfide, a liquid absorbent is used which is in particular an efficient solvent for carbon dioxide. Consequently, after regeneration of the absorbent, a hydrogen disulfide/carbon dioxide-containing gas will be obtained which subsequently requires further processing in a Claus plant. As long as such gases have a relatively low carbon dioxide content (up to about 15 percent by volume) and a relatively high hydrogen sulfide (more than 25 percent by volume), they can be readily processed in a Claus plant. However, if the hydrogen sulfide content of the gases obtained in the regeneration of loaded liquid absorbents is less than 25 percent by volume and the carbon dioxide content of said gases is equal to or higher than the hydrogen sulfide content, the Clause plant is difficult to operate in respect to its thermal zone, and special measures have to be taken during the combustion of a portion of the hydrogen sulfide for the production of the quantity of sulfur dioxide required for the Claus reaction. These operational difficulties arise largely because the requisite temperatures for the combustion of the hydrogen sulfide cannot be attained in the thermal zone.

The present invention envisages a process for the treatment of gases which, in addition to a relatively low hydrogen sulfide content, also contain carbonyl sulfide and/or mercaptans and carbon dioxide in such a way that the gas mixture obtain after regeneration of the loaded liquid absorbent can be processed into elemental sulfur in a sulfur recovery unit. Another object of the invention is to carry out the process in such a way that the sulfur recovery efficiency of the sulfur recovery unit is increased by additionally subjecting its off-gases to a further treatment for the removal of residual sulfur compounds so that the off-gases may be discharged to the environment without objection.

SUMMARY OF THE INVENTION

Accordingly, the invention, in one form, relates to a process for the treatment of a gas containing hydrogen sulfide, carbon dioxide, and organic sulfur compounds, the gas having a relatively high carbon dioxide content in relation to the hydrogen sulfide present, comprising (a) introducing the gas into a first absorption zone where it is countercurrently contacted with a regenerable absorption liquid supplid to said zone to remove hydrogen sulfide and organic sulfur compounds under conditions which are nonselective or slightly selective in respect of the co-absorption of carbon dioxide, said first absorption zone being divided into at least two sections arranged one above the other and the gas being introduced into the lowest of the sections and the absorption liquid being supplied to an upper section, the absorption liquid being intermediately cooled outside the absorption zone before being supplied from an upper section to a lower section, (b) passing the treated gas from the absorption zone and passing the regenerable absorption liquid, loaded with hydrogen sulfide, organic sulfur compounds, and carbon dioxide, from the lower section of the first absorption zone to a regeneration zone, and regenerating the absorption liquid by heating and/or stripping to yield a gas mixture containing hydrogen sulfide, organic sulfur compounds, carbon dioxide, and a regenerated absorption liquid, a portion of which is supplied to an upper section of the first absorption zone, and a portion of which is supplied to a second absorption zone;

(c) passing a portion of the gas mixture obtained in step (b) to a catalytic reduction zone, in which sulfur compounds other than hydrogen sulfide are converted into hydrogen sulfide at temperatures between 180° and 450° C. in the presence of hydrogen and/or carbon monoxide over a catalyst suitable therefor, and passing the rest of said gas mixture to a sulfur recovery unit, and converting the hydrogen sulfide in the mixture to sulfur with recovery of the resultant sulfur and an off-gas;

(d) passing the off-gas from the sulfur recovery unit to the said catalytic reduction zone in order to convert into hydrogen sulfide any remaining sulfur compound;

(e) passing the combined gas mixture leaving the catalytic reduction zone and containing substantially hydrogen sulfide to a second absorption zone and contacting said gas combined mixture at a temperature below the dew point of water with the same regenerable absorption liquid as used in the first absorption zone, under operating conditions which are selective in respect of the co-absorption of carbon dioxide;

(f) discharging the unabsorbed portion of the combined gas mixture from step (d) and passing the absorption liquid substantially loaded with hydrogen sulfide at least partly to the upper section of the first absorption zone.

In another form, the invention comprises a process for the treatment of a gas containing carbon dioxide, hydrogen sulfide, and organic sulfur compounds, the gas having a relatively low content of said gases, but a relatively high carbon dioxide content in relation to the hydrogen sulfide present comprising (a) introducing the gas into a first absorption zone where it is countercurrently contacted with a regenerable absorption liquid supplied to said zone to remove hydrogen sulfide and organic sulfur compounds under conditions which are nonselective or slightly selective in respect of the co-absorption of carbon dioxide;

(b) passing the treated gas from the absorption zone and passing the regenerable absorption liquid, loaded with hydrogen sulfide, organic sulfur compounds, and carbon dioxide, from the first absorption zone to a regeneration zone, and regenerating the absorption liquid by heating and/or stripping to yield a gas mixture containing $H_2S$, organic sulfur compounds, carbon dioxide, and a regenerated absorption liquid, a portion of which is supplied to the first absorption zone, and a portion of which is supplied to a second absorption zone;

(c) passing a portion of the gas mixture obtained in step (b) to a catalytic reduction zone, in which sulfur compounds other than hydrogen sulfide are converted into hydrogen sulfide at temperatures between 180° and 450° C. in the presence of hydrogen and/or carbon monoxide over a catalyst suitable therefor, and passing the rest of said gas mixture to a sulfur recovery unit and converting the hydrogen sulfide in the mixture to sulfur with recovery of the resultant sulfur and an off-gas;

(d) passing the off-gas from the sulfur recovery unit to the said catalytic reduction zone in order to convert into hydrogen suflide any remaining sulfur compounds;

(e) passing the combined gas mixture leaving the catalytic reduction zone and containing substantially hydrogen sulfide to a lower section of a second absorption zone divided into at least two sections arranged one above the other, absorption liquid being supplied to an upper section, and the absorption liquid being intermediately cooled outside the second absorption zone before being supplied from an upper section to a lower section, gas mixture being contacted at a temperature below the dew point of water with the same regenerable absorption liquid as used in the first absorption zone, under operating conditions which are selective in respect of the co-absorption of carbon dioxide;

(f) removing the unabsorbed portion of the combined gas mixture from step (d) and passing the absorption liquid substantially loaded with hydrogen sulfide to the regeneration zone.

By "Claus reaction" is meant the reaction between hydrogen sulfide and sulfur dioxide whereby elemental sulfur and water are produced. By "thermal sulfur recovery unit" is understood a plant for carrying out the Claus reaction, which plant comprises a thermal zone in which hydrogen sulfide is partially combusted in order to obtain the required quantity of sulfur dioxide which subsequently enters into reaction with uncombusted hydrogen sulfide, forming sulfur and water, which sulfur is subsequently condensed and removed, followed by at least one or more catalytic zones in which the same reaction is further promoted and additional sulfur is removed.

By "nonthermal sulfur recovery unit" is understood a Claus plant not comprising a thermal zone, such a sulfur unit only has catalytic zones in which the Claus reaction takes place and elemental sulfur is produced.

Unless expressly stated otherwise herein, a sulfur recovery unit refers both to a thermal and a nonthermal sulfur unit.

By "Claus off-gas" is meant the remaining gases as obtained after the final catalytic zone of a sulfur recovery unit. In general, it is customary for such residual gases further to pass through a condenser for the separation of elemental sulfur present. Although it is customary to use two catalytic zones, a third catalytic zone is also regularly used. Besides hydrogen sulfide and sulfur dioxide in a ratio of approximately 2:1, this type of off-gas also contains elemental sulfur, hydrogen, nitrogen, and minor quantities of inert gases if the thermal sulfur plant is operated with air, water in the form of water vapor, carbon dioxide and minor quantities of carbon monoxide, carbonyl sulfide, and carbon disulfide.

By "conditions which are selective in respect of the co-absorption of carbon dioxide" is meant that such a temperature, gas velocity and/or pressure are used that the smallest possible absorption of carbon dioxide takes place.

The process according to the invention can be very suitably used for hydrogen sulfide-containing gases having a calculated hydrogen sulfide/carbon dioxide ($H_2S/CO_2$) ratio smaller than 1. More in particular, said calculated $H_2S/CO_2$ ratios may lie between 0.9 and 0.001. By the calculated $H_2S/CO_2$ ratio of a gas is understood that ratio which is found by expressing all sulfur-containing compounds present in the gas in terms of hydrogen sulfide equivalents. Hereinafter, by $H_2S/CO_2$ ratio will invariably be understood the calculated ratio unless expressly stated otherwise. An example of a gas having a low $H_2S/CO_2$ ratio is, for instance, a hydrogen-containing gas obtained by partial combustion of coal, with 50 percent of carbon dioxide and 1,000 ppmv (calculated) and having a $H_2S/CO_2$ ratio of 0.002. Such a gas can suitably be further purified by means of the process according to the invention.

The process according to the invention can also be used for hydrogen sulfide-containing gases having an $H_2S/CO_2$ ratio larger than 1, if the supply of such gases diminishes during the operation of the sulfur unit. If the throughput of such gases is reduced by 25 percent or more (a turndown ratio of 75 percent or less), the process of the invention also provides a solution.

The process according to the invention renders it possible for gases containing a relatively large proportion of organic sulfur compounds, such as carbonyl sulfide, and little hydrogen sulfide, in addition to a large quantity of carbon dioxide, to be purified of the sulfur compounds without problems arising in the production of elemental sulfur. Although a certain degree of conversion of carbonyl sulfide in a catalytic zone of a sulfur unit is possible, its complete conversion is not attainable because of the thermodynamic equilibrium, and carbonyl sulfide will invariably be present in the Claus off-gas. The carbonyl sulfide is now further converted to hydrogen sulfide in the catalytic reduction zone in step (d) where the thermodynamic equilibrium is less unfavorable in respect of the conversion of carbonyl sulfide. After absorption and recycling to the first absorption zone, the resultant hydrogen sulfide contributes to raising the hydrogen sulfide content in the feed to the sulfur recovery unit. In the second absorption zone following the catalytic reduction zone, the larger amount of carbon dioxide absorbed in the first absorption zone under the nonselective absorption conditions used there is largely rejected as a result of the use of operating conditions which are selective in respect of the co-absorption of carbon dioxide. The hydrogen sulfide-free gas mixture which is discharged from the second absorption zone consists substantially of carbon dioxide and nitrogen.

By using the same absorption liquid both in the first absorption zone and in the second absorption zone, it is possible for its regeneration to take place in a single regeneration zone. The absorption liquid from the second absorption zone is supplied at least partly to the upper section of the first absorption zone. Preferably, however, all the liquid from the second zone is introduced at the top of the first zone, but it is possible to introduce at least part thereof (between 0 and 50 percent) into the regeneration zone direct.

The first absorption zone consists of at least two separate sections which are flowed through countercurrently in relation to each other by the gases to be treated and the absorption liquid. Preferably, the absorption zone consists of two sections, one above the other, the gases to be treated being introduced into the lower section and the absorption liquid into the upper. The absorption zone is provided with such means that the gases are able to ascend unimpeded from the lower section to the upper, but the downward flow of absorption liquid is interrupted in order to be able to remove said liquid from the zone for the purpose of cooling.

The regenerated absorption liquid from step (b) is preferably introduced at the top of the upper section of the first absorption zone, whereas the absorption liquid loaded substantially with hydrogen sulfide is introduced in step (f) at the bottom of the said upper section.

It is preferred that in step (a) the regenerable absorption liquid should be intermediately cooled to a temperature equal to or substantially equal to the temperature of the liquid which is supplied to the upper section. Preferably, the absorption liquid in step (a) is intermediately cooled to a temperature between 20° and 70° C.

Intermediate cooling has the advantage that for a desired loading of the absorption liquid (in correlation with the desired purification of the gases to be treated) it is possible to use less absorption liquid than without intermediate cooling. As a result of this, less heat and/or steam is required for the regeneration of the liquid in step (b). The process of the invention is especially significant at low partial pressures (lower than 1 bar) of the hydrogen sulfide. This process works to its best advantage when used for the purification of gases which have a partial hydrogen sulfide vapor pressure of 0.02 to 0.4 bar at a temperature of 40° C. of the regenerated absorption liquid.

Intermediate cooling of the absorption liquid is also important in those cases where the process of the invention is used in regions where the ambient temperature exceeds 40° C. for part of the year and consequently, the cooling of the absorption liquid to lower absorption temperature presents problems.

For the purpose of intermediate cooling in step (a), the absorption liquid is preferably discharged from the first absorption zone at a point located between the fifth and the fifteenth contact layer (calculated from the introduction of the gas) in an absorption zone of from ten to fifty contact layers. Hence it also follows that in general, the lower section of the absorption zone contains a smaller number of contact layers or trays than the upper section.

The gas mixture obtained in step (b) and containing hydrogen sulfide, carbonyl sulfide, and carbon dioxide is at least partly supplied to the sulfur recovery unit. The other part of said gas mixture bypasses the sulfur recovery unit and is introduced directly into the catalytic reduction zone following the sulfur recovery unit after being heated to above 180° C. Said method has the following advantages. In the hydrogen sulfide-containing gas to be processed, there may be present in addition to carbonyl sulfide other sulfur-containing compounds, such as carbonyl disulfide, mercaptans, and/or disulfides. Under the conditions prevailing in the catalytic reduction zone, the said compounds, in common with the carbonyl sulfide, are converted into hydrogen sulfide. In the second absorption zone after said catalytic reduction zone, all the hydrogen sulfide present is selectively removed, while the carbon dioxide present largely slips through the absorption zone as a result of the absorption conditions used, which are selective in respect of the coabsorption of carbon dioxide. The loaded absorbent will therefore contain substantially hydrogen sulfide. In the combined regeneration of the absorbent from the first absorption zone and from the second absorption zone a gas mixture for the sulfur unit is then obtained which has a considerably more favorable $H_2S/CO_2$ ratio than the gas mixture which would be obtained if a part of the gas mixture did not bypass the said sulfur unit. It is desirable, however, that at all times, an unchanging or substantially unchanging quantity of the gas mixture should bypass the sulfur recovery unit and the quantity which is supplied to said unit should be made dependent on the supply of hydrogen sulfide-containing gases to be treated. As a result of this, the operation of the entire process, and in particular that of the second absorption zone, is rendered independent of the turndown. Preferably, the quantity of gas mixture which bypasses the sulfur recovery unit is selected such that the sulfur recovery unit remains readily operable at a turndown of 30 percent. If the supply of gases to be treated diminishes for some reason, this will not affect the operation of the second absorption zone since a smaller proportion of the gas mixture is supplied to the sulfur recovery unit, namely in such a way that the absolute quantity bypassing the sulfur recovery unit remains substantially constant. In the case of different turndown ratios, a smaller or larger quantity as appropriate is supplied direct. The bypassing of the sulfur recovery unit by part of the gas mixture has a secondary effect in that the improved $H_2S/CO_2$ ratio allows the sulfur unit to be constructed smaller because a large quantity of carbon dioxide has already been discharged from the process through the second absorption zone.

In general, if it is assumed that it is desirable for the feed to a thermal sulfur unit to contain at least 40 percent by volume of hydrogen sulfide in order to preclude operational difficulties in the thermal zone of the unit, the fraction of the gas mixture obtained in step (b) during regeneration of the loaded absorption liquid to be supplied to the sulfur recovery unit in step (c) should be numerically equal or substantially equal to the calculated $H_2S/CO_2$ ratio of the gas supplied to the first absorption zone in step (a). By calculated $H_2S/CO_2$ ratio is meant that all the sulfur compounds present in said gas are expressed in terms of hydrogen sulfide equivalents. If the calculated $H_2S/CO_2$ ratio is equal, for example, to 0.25, then the process according to the invention will yield optimum results if $\frac{1}{4}$ of the gas mixture obtained in step (b) is supplied as feed to the sulfur unit, while $\frac{3}{4}$ of said gas mixture is supplied to the catalytic reduction zone direct.

Those skilled in the art will recognize that a nonthermal sulfur recovery unit may be used instead of a thermal sulfur recovery unit. In that case, the sulfur oxide, required for the Claus reaction can be obtained by combusting in a separate burner a part of the produced elemental sulfur to form sulfur oxide, with the aid of air, oxygen or oxygen-enriched air.

The process according to the invention is suitably used for the further processing of all hydrogen sulfide-containing gases which have a relatively high carbon dioxide content and thereby an unfavorable $H_2S/CO_2$ ratio. Hydrogen sulfide-contining gases, such as natural gas or synthesis gas, which contain large quantities of carbon dioxide can therefore be very suitably further processed. The present process is especially advantageously used on hydrogen sulfide-containing gases which are obtain in a partial combustion process of heavy oil fractions or coal. According to the type of industrial gas, the hydrogen sulfide-containing gas can contain hydrogen cyanide in addition to organic sulfur compounds. The organic sulfur compounds may be carbonyl sulfide, carbon disulfide, mercaptans, and/or disulfides. Depending on its origin, natural gas can contain lower alkyl mercaptans and the corresponding disulfides. The lower alkyl mercaptans contain alkyl groups having at most six carbon atoms.

The hydrogen sulfide containing gas mixture obtained from regeneration in step (b) generally has a composition which is improved in respect of its $H_2S/CO_2$ ratio and contains relatively fewer organic sulfur compounds than the gas which would be obtained according to the state of the art.

In general, hydrogen sulfide-containing gases, with a calculated $H_2S/CO_2$ ratio smaller than 1 and having 0.0005 to 2.5 percent by volume of COS, 0 to 1.5 percent by volume of carbon disulfide, and 0 to 1.2 percent by volume of mercaptans and/or disulfides, are suitable to be treated according to the process of the invention.

Preferably the absorbent used in the first absorption zone and in the second absorption zone is an aqueous solution of a physical solvent such as sulfolane or a derivative thereof with a weak base. Such an aqueous solution will hereinafter be called a "sulfinol" solution. A regenerable liquid which can suitably be used according to the process of the invention is an aqueous solution of a base having a 3 to 8 $pK_b$ 25° C. in a proportion of 10 to 70 percent by weight and sulfolane and/or its derivatives in a proportion of 25 to 70 percent by weight. Suitable bases are alkanolamines containing from one to four and preferably from two to three carbon atoms per alkanolamine group. Examples of these are diethyl monoethanolamine, methyl diethanolamine, di-isopropanolamine, and mixtures thereof. Preferably, the regenerable absorption liquid contains 20 to 55 percent by weight of alkanolamine and 30 to 55 percent by weight of the sulfolane or the derivative thereof. The rest of the mixture consists of water, generally 5 to 35 percent by weight.

In the second absorption zone the same absorption liquid is used as in the first absorption zone under conditions which are selective in respect of the co-absorption of carbon dioxide. This will be the case when relatively high gas velocities are used. At the same time, the pressure is preferably selected as low as possible, for example, atmospheric pressure or a pressure which has a slight excess pressure (0 to 1 $kg/cm^2$) (0 to 98.0 kPa) in relation to the atmospheric pressure. In more general terms, the pressure will be lower than 5 $kg/cm^2$ (490 kPa). The gas velocities used exceed 0.5 m/sec and preferably 0.9 m/sec. In particular, gas velocities from 1 to 2.5 m/sec are used. The gas velocities are based on the "active" or aerated surface area of the trays to be used. The absorption temperature used is preferably chosen as low as possible in order to promote the selectivity of the hydrogen sulfide absorption, and temperatures between 15° and 65° C. are preferred.

The absorption liquid is used in the first absorption zone under conditions which are nonselective or slightly selective in respect of the co-absorption of carbon dioxide. This is the case when relatively low gas velocities (lower than 0.5 m/sec) are used at pressures in excess of the atmospheric pressure. Preferably, pressures from 5 to 70 $kg/cm^2$ (490 to 6,865 kPa) are used. The gas velocities are preferably in the range from 0.02 to 0.4 m/sec, the gas velocity again being defined in relation to the aerated surface area of the trays to be used.

The temperatures to be used in the first absorption zone are in the range of from 15° to 135° C. and preferably from 30° to 80° C. At the same time, it is preferred that the absorption be so carried out that the temperature at the bottom of the absorption zone is only 5° to 30° C. higher than the temperature at the top of the absorption zone.

This preferred condition can be controlled by dividing the first absorption zone into two separate sections and by intermediate cooling of the absorption solution. Before the absorption liquid from the upper absorption section is introduced into the lower, it is first recooled outside the absorption zone to a temperature approximately equal to that of the absorption liquid which is supplied to the upper section.

The second absorption zone generally has fewer than twenty and preferably four to fifteen trays or contact layers.

If the first absorption zone contains two separate sections, the number of trays or contact layers in the lower section is smaller than that in the upper section.

In the catalytic reduction zone, the off-gas from the catalytic zone of the sulfur recovery unit, together with that part of the gas mixture which bypasses the sulfur recovery unit, is subjected to a reducing treatment in order to convert sulfur compounds other than hydrogen sulfide into hydrogen sulfide.

After the Claus off-gases have passed the last catalytic zone and an optional condenser for the recovery of elemental sulfur, they normally have a temperature of less than 170° C. However, for the reduction stage over a catalyst the off-gases should have a higher temperature, for which reason these off-gases are first heated to a temperature in excess of 170° C. The Claus off-gases are preferably brought to a temperature which is between 180° and 450° C. and more preferably between 200° and 350° C.

The increase in temperature to more than 170° C. is also important in view of the presence of small quantities of elemental sulfur in the form of a haze in the off-gases. This unacceptable sulfur haze disappears by raising the temperature to above the dew point of sulfur. It has also been found that by raising the temperature to above 170° C. and preferably above 180° C. the presence of any elemental sulfur in the gaseous phase from the sulfur unit does not have an adverse effect on the catalytic activity of the reduction catalyst to be used in the reduction zone.

By simultaneously passing the Claus off-gas and said portion of the gaseous mixture at the indicated temperature over preferably a sulfided catalyst of the Group VI and/or Group VIII metal, all sulfur components of the gaseous mixture other than hydrogen sulfide, including any mercaptans and/or disulfides present, are converted into hydrogen sulfide. Sulfur dioxide will be reduced by the hydrogen present while carbonyl sulfide and/or carbon disulfide are hydrolyzed over the catalyst to hydrogen sulfide and water. Also carbonyl sulfide and carbon disulfide will be hydrogenated to a certain extent. Under the conditions specified, any elemental sulfur present will also be reduced to hydrogen sulfide.

The conversion in the catalytic reduction zone mentioned in step (b) and in step (c) of the precess according to the present invention is preferably carried out at a temperature between 200° and 350° C. in the presence of at least the stoichiometric quantity of hydrogen and/or carbon monoxide required for complete conversion of sulfur dioxide and elemental sulfur into hydrogen sulfide. Generally, 1.3 to 2.0 times the required stoichiometric quantity is used. Larger quantities of hydrogen and/or carbon monoxide are unsuitable for economic reasons only.

The pressure used in the catalytic reduction zone is generally equal to or slightly lower than the pressure used in the preceding sulfur unit. The pressure in this reduction zone is generally of from 0.7 to 2 kg/cm$^2$ (68.6 to 196.1 kPa) abs.

For the purpose of the present invention, carbon monoxide is equivalent to hydrogen in respect of reducing capacity since it forms hydrogen in situ according to the following reaction equation:

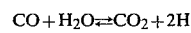

$$CO + H_2O \rightleftharpoons CO_2 + 2H$$

It has been found that reduction of sulfur dioxide with the aid of carbon monoxide is a very fast reaction as a result of the hydrogen formed in situ. For this reason, particular preference is given to the use of a hydrogen- and a carbon monoxide-containing gas in step (e). A gas having a H$_2$/CO ratio between 9:1 and 2:8 may suitably be used while preference is given to a gas having a H$_2$/CO ratio of 4:1.

The hydrogen- and/or carbon monoxide-containing gas used is preferably a gas containing both compounds, such as town gas, water, gas, or synthesis gas. Pure hydrogen or carbon monoxide can also be used. Suitable hydrogen-rich gases and gas mixtures are the off-gases from a catalytic reforming unit, the gas originating from a hydrogen unit or the gas originating from a unit for the processing of saturated crude petroleum gases. A hydrogen- and carbon monoxide-containing gas may also be obtained by sub-stoichiometric combustion of hydrocarbon gases such as methane, ethane, propane, butane, or mixtures thereof with the aid of a suitable burner. The preparation of such a gas may suitably be combined with the joint heating of the Claus off-gas and of the said portion of the gas mixture passed to the reduction zone, up to the required reaction temperature, by mixing it in a reaction chamber which follows the combustion chamber of the burner used for the sub-stoichiometric combustion.

Although sulfided catalysts of a Group VI and/or Group VIII metal supported on an inorganic oxidic carrier are generally suitable, preference is given for effecting the present invention to the use of reduction catalysts containing one or more of the following metals: molybdenum, tungsten, and chromium (Group VI metals) and/or one or more of the metals: cobalt, nickel, and iron (Group VIII metals) while a combination of such a Group VI metal and such a Group VIII metal is preferred. The inorganic oxidic carrier may be alumina, silica, magnesia, boria, thoria, zirconia, or a mixture of two or more of these compounds. Reduction catalysts which are most preferred for use in the process according to the invention are a Ni/Mo/Al$_2$O$_3$ or a Co/Mo/Al$_2$O$_3$ catalyst.

The Group VI and/or Group VIII metal catalyst is used in the sulfided form. The catalyst may be presulfided by means of a suitable sulfiding agent such as a mixture of hydrogen and hydrogen sulfide containing 10 to 15 percent by volume of hydrogen sulfide. The catalyst can also be sulfided in situ by means of the reaction off-gas proper. However, a sulfiding mixture which contains hydrogen, hydrogen sulfide, and water in a ratio of 1:1:1 is particularly suitable, the temperature used being between 300° and 400° C. The catalyst to be sulfided may contain the Group VI and/or Group VIII metals as oxide or in the form of the element.

Before being contacted with the liquid absorbent for hydrogen sulfide, the reduced gas mixture obtained in step (d) is first cooled in accordance with common practice. It is preferably cooled to a temperature from 6° to 60° C. The cooling is preferably carried out in two stages, indirect heat exchange with water taking place in the first stage and direct heat exchange with water in the second stage.

After cooling, the reduced gas mixture is contacted in an absorption zone with the liquid and regenerable solvent under conditions which are selective in relation to the co-absorption of carbon dioxide, as described.

After the reduced gas mixture has been passed through the absorbent, the nonabsorbed portion thereof which now substantially comprises nitrogen, carbon dioxide, very small quantities of hydrogen, and traces of hydrogen sulfide, is discharged to the atmosphere. If desired, this nonabsorbed portion may also be combusted in the usual way before it is passed to the stack.

Regeneration of the loaded solvent in step (b) is generally effected at temperatures between 100° and 190° C. and pressures between 0 and 4 kg/cm$^2$ (0 and 392 kPa) excess pressure. The required regeneration heat is supplied in the usual way by indirect heating or by steam stripping. What portion of the regenerated absorption liquid is recycled to the first absorption zone and what proportion to the second depends on many factors, primarily on the gas composition of the gas to be treated in accordance with the process of the invention and the concomitant loading of the absorption liquid used. In general, it may be said that 40 to 80 percent of the total liquid is supplied direct to the first absorption zone.

The invention will now be elucidated with reference to the drawing and illustration (calculated).

FIG. 1 is a simplified process scheme in which auxiliaries such as pumps and valves have been omitted and in which a hydrogen sulfide-containing gas stream is partly passed to the sulfur recovery unit and partly bypasses the said unit.

Figure 2:
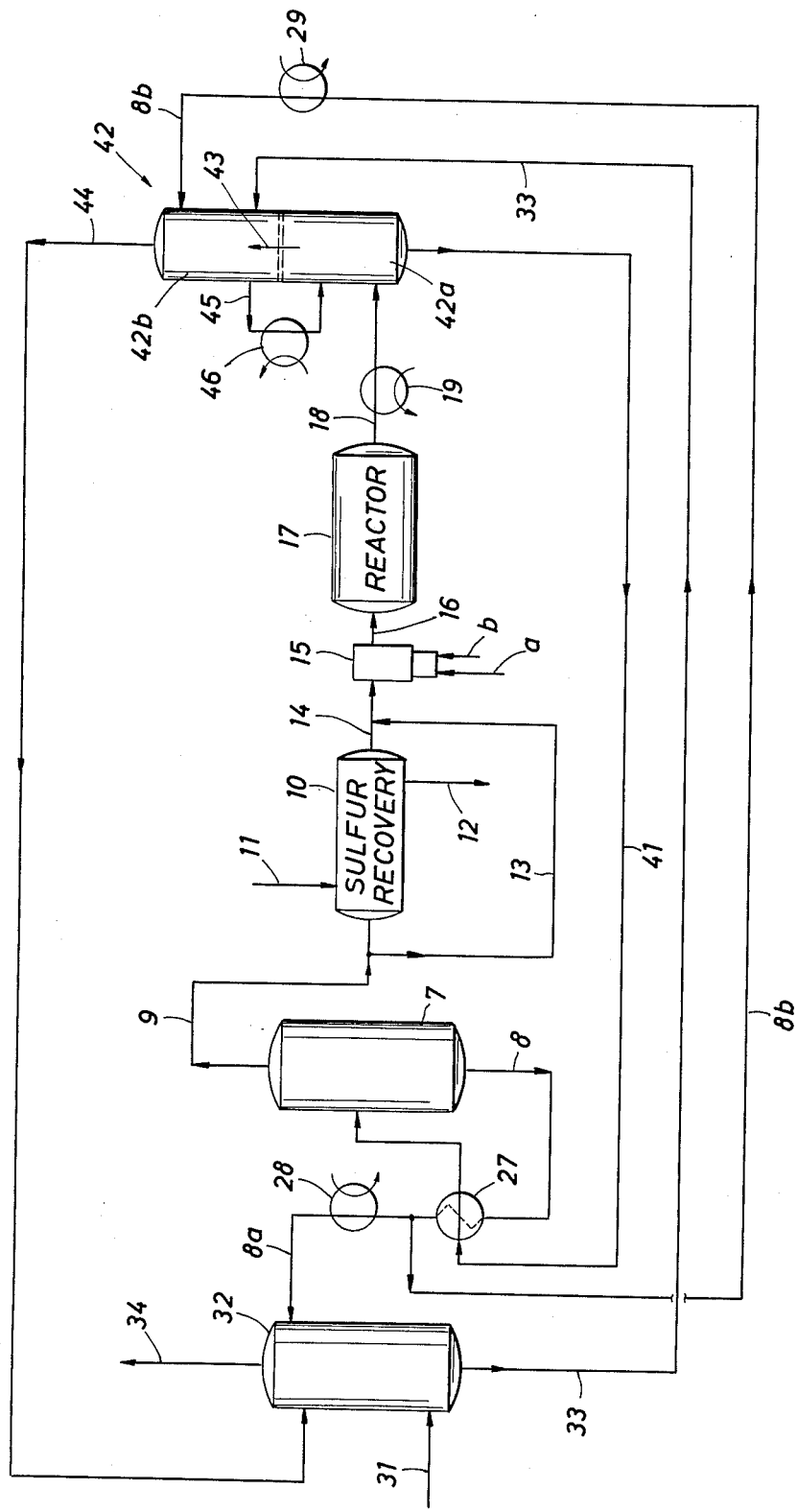

FIG. 2 also represents a simplified process scheme showing an alternative configuration for the absorption column with intermediate cooling of the absorbent in the second absorption zone.

In FIG. 1, a gas mixture containing hydrogen sulfide as well as carbon dioxide and carbonyl sulfide is introduced into the lower section of absorption column 2 via a line 1. The absorbent used is an aqueous sulfinol solution and the absorption conditions are such that a nonselective absorption of hydrogen sulfide, carbon dioxide, and carbonyl sulfide takes place. The gas mixture passes through column 2 countercurrently to the sulfinol solution. The mixture leaves the lower section 2a via a line 3 and is passed into the bottom of the upper section 2b. The purified gas mixture, which is substantially free of the said compounds, leaves the absorption column 2 via a line 4.

The regenerated sulfinol solution is introduced into the top of section 2b via a line 8a. This sulfinol solution, which during the countercurrent contact with the gas mixture increases in temperature by absorption therein of hydrogen sulfide, carbon dioxide and carbonyl sulfide, and any other absorbable gas components, leaves the upper section 2b via a line 5 and is introduced into the top of section 2a after cooling in a cooler 26 to a temperature which is approximately equal to that of the absorbent which is introduced into the top of section 2b. After having passed this latter section, the solvent which is loaded with hydrogen sulfide, carbon dioxide, and carbonyl sulfide is passed via a line 6 and a heat exchanger 27 to a regeneration column 7. In heat exchanger 27, the loaded solvent is brought into heat exchange with the regenerated solvent which is partly passed from the regeneration column 7 through line 8 to the absorption section 2b via a line 8a, the heat exchanger 27 and a cooler 28.

Another portion of the regenerated solvent the top of a second absorption column 20 via a line 8b and a cooler 29.

During regeneration of the loaded solvent, a gas mixture is obtained which mainly consists of hydrogen sulfide, carbon dioxide, and carbonyl sulfide. It has an improved $H_2S/CO_2$ ratio in relation to the gas mixture which is introduced into column 2 via the line 1. The reason for this is explained in greater detail below.

A gas mixture is discharged from column 7 through a line 9 partly passing to a sulfur recovery unit 10 and partly bypassing the said unit via a line 13. The quantity which bypasses the sulfur recovery unit is also determined by the quantity of carbon dioxide present. If the $H_2S/CO_2$ ratio is relatively unfavorable for the sulfur recovery unit, a greater quantity will have to bypass this unit. The sulfur recovery unit 10 comprises a thermal stage and an aftercooler/sulfur condenser as well as a number of catalytic stages with intermediate coolers/sulfur condensers (not shown in the drawing). In said unit, the hydrogen sulfide is converted, a oxygen-containing gas being supplied via a line 11 and elemental sulfur being discharged via a line 12. The reaction off-gas leaves the sulfur recovery unit via a line 14. The portion of the gas mixture which has bypassed the unit 10 via a line 13 is added in a line 14 to the off-gas of the sulfur recovery unit 10, and these gases are jointly supplied to an in-line burner 15. In this burner, a hydrogen- and carbon monoxide-containing gas is obtained by sub-stoichiometric combustion of a hydrocarbon gas. The hydrocarbon gas and the required oxygen-containing gases are passed to the burner via lines a and b. In the burner 15, the gas mixture is mixed with the hot combustion gas, a hot gas mixture which also contains the required hydrogen and carbon monoxide being subsequently passed via a line 16 into a reactor 17 in which sulfur ompounds other than hydrogen sulfide, such as sulfur dioxide, carbonyl sulfide, and/or mercaptans are converted over a reduction catalyst into hydrogen sulfide. The reduced gas mixture, which contains substantially no sulfur compounds other than hydrogen sulfide, leaves the reactor 17 via a line 18 and is cooled in a heat exchanger 19. (Instead of indirect cooling in a heat exchanger 19, a two-stage cooling method with indirect and direct heat exchange may be used). After cooling, the cooled gas mixture is passed to an absorption column 20 which is operated under such conditions that the absorption is selective in relation to the co-absorption of carbon dioxide. The nonabsorbed components of the gas mixture, which consist principally of carbon dioxide and nitrogen, are discharged from the unit 20 through a line 22. In order to convert all traces of hydrogen sulfide, the nonabsorbed gas components are combusted in a combustion oven 23 before they are discharged to the atmosphere through a line 24. The hydrogen sulfide-rich absorbent is recycled to the first absorption column 2 via a line 21 and introduced at the bottom of the upper section 2b. As a result, the $H_2S/CO_2$ ratio of the gas mixture obtained during regeneration is favorably affected. If desired, a portion of the loaded solvent which is discharged from the absorption column 20 via a line 21 may be introduced directly into the regeneration column 7 via a line 25. This possibility enhances the flexibility of process operation.

In FIG. 2, all reference numerals have remained unaltered insofar as they relate to the same parts as in FIG. 1. A process scheme as shown in said figure may be suitably used in those cases in which the absorption liquid from the first absorption column is less loaded than that from the second absorption column. This may be the case when the first column must be operated at atmospheric pressure while the gas to be treated has a low acid gas component content. In the case shown, a gast stream 31 is introduced into a simple absorption column 32 wherein the stream is brought into countercurrent contact with a sulfinol solution under nonselective conditions. The treated gas leaves the absorption column 32 via a line 34, while the absorption liquid which is only partly loaded is supplied via a line 33 to the upper section 42b of the second absorption column 42 where it is introduced into the bottom of this section.

The gas leaving the reduction reactor 17 is introduced via a line 18 and a heat exchanger 19 into the bottom of the lower section 42a of the second absorption column, where it is countercurrently contacted with the absorption liquid. This second column is operated under such conditions that the absorption is selective in relation to the co-absorption of carbon dioxide. The gas mixture leaves the lower section via a line 43 and subsequently passes through the upper section 42b. The non-absorbed gas components (essentially carbon dioxide and nitrogen) leave the second absorption column via a line 44 and may optionally be further treated as indicated in FIG. 1. In the case depicted, the nonabsorbed components are recycled in FIG. 2 to the first absorption column 32 and introduced therein at the top in order to remove as much as possible any sulfur compounds still present (hydrogen sulfide and/or nonconverted carbonyl sulfide) from the said components. It is of vital importance that only a small number of top trays of column 32 be used for this purpose in order to prevent carbon dioxide from again being co-absorbed to a considerable extent. This way of final purification of the gas components in the line 44 can only be suitably carried out in those cases in which both the absorption columns are operated at (approximately) the same pressure and in which the non-absorbed gas components do not form an undesired contamination for the product gas in the line 34.

The absorption liquid which is introduced into the upper section 42b leaves the second absorption column via a line 45 for intermediate cooling in a cooler 46 and is subsequently introduced into the lower section 42a of the column. The loaded absorption liquid leaves the second absorption column via a line 41 and is recycled via a heat exchanger 27 to a regeneration column 7. After regeneration, the absorption liquid is partly recycled to the first absorption column 32 via a line 8a and partly to the upper section 42b of the second absorption column via a line 8b as described above.

In the embodiment of FIG. 2, cases are conceivable in which it is preferred to recycle all of the regenerated absorption liquid to the first absorption column 32 and subsequently to pass it all to the second absorption column where the absorption liquid is again introduced at the top of the upper section 42b.

Illustrative Embodiment (Calculated)

A quantity of 200 kmol/h of a gas stream which contains hydrogen sulfide, carbon dioxide, and carbonyl sulfide and which is obtained from a process for the gasification of crude oil is treated in accordance with the process scheme shown in FIG. 1. The gas stream is introduced into the lower section of the absorption column at a pressure of approximately 20 bar and a temperature of 60° C. The absorbent used is sulfinol solution which contained 40 percent by weight of sulfolane, 45 percent by weight of di-isopropanolamine, and 15 percent by weight of water. It is introduced at the top of the upper section of the absorption column at a temperature of 40° C. In addition, a sulfinol solution partly loaded with hydrogen sulfide and carbon dioxide is introduced into the bottom of the upper section of this column at a temperature of 49° C. The entire solution is recycled to the top of the lower section of the absorption column after being cooled from 59° to 40° C. in a cooler arranged outside the column. The treated gas flowing from the upper section of the absorption column is substantially free of hydrogen sulfide and contains only a small quantity of carbonyl sulfide. After atmospheric regeneration of the sulfinol solvent, a hydrogen sulfide-containing gas stream is obtained with a high carbon dioxide content, which gas stream also contains carbonyl sulfide. This gas stream is partly passed to a sulfur recovery unit (27 percent) while the rest (73 percent) is mixed with the reaction off-gas from the sulfur recovery unit, which off-gas is obtained in a quantity of 6.34 kmol/h and at a temperature of 150° C. The combined gas mixture which now contains, inter alia, sulfur dioxide and a quantity of elemental sulfur, is heated in an in-line burner to 290° C. and supplied at this temperature to the reduction reactor which contains a sulfided $Co/Mo/Al_2O_3$ catalyst. In the reactor, the sulfur compounds other than hydrogen sulfide are converted in the presence of excess hydrogen and carbon monoxide which are supplied to the reactor as a separate gas stream. The gas mixture originating from the reduction reactor contains no sulfur dioxide or elemental sulfur and a reduced content of carbonyl sulfide. The mixture is cooled to 40° C. and supplied to an atmospheric absorption column in which the same sulfinol solution is used as in the absorption column with a lower and upper section. The absorption column has fewer than twenty trays with valves and the gas velocity used is approximately 1.5 m/sec in respect of the "aerated" part of the said trays. The nonabsorbed part of the treated gas mixture essentially contains nitrogen and carbon dioxide and only very small quantities of hydrogen sulfide and carbonyl sulfide. This portion is passed to a catalytic combustion furnace, which is operated at a temperature of 375° C. and in which hydrogen sulfide and carbonyl sulfides are combusted to sulfur dioxide. The substantially hydrogen sulfide-loaded absorption solution from the atomospheric absorption column is passed to the upper section of the first absorption column as mentioned above. The composition (calculated) of the various gas streams is shown in the table below. For the total regeneration of the absorbent in the regeneration column, 0.9 t of steam/h is required. If no intermediate cooling of the solvent in the high pressure absorption column takes place, 1.25 of steam/h is required.

TABLE

| Stream No. Composition | 1* | 4 | 9** | 14 | 16 | 18 | 22 |
|---|---|---|---|---|---|---|---|
| | Relative feed stream = 200 kmol.; (composition in % by vol.) | | | | | | |
| $H_2S$ | 1.32 (0.7) | $6.10^{-4}$(3ppmv) | 5.36 (40.6) | 0.052 (0.8) | 3.96 (23.0) | 4.04 (23.5) | $5.10^{-3}$(500ppmv) |
| $SO_2$ | — | — | — | 0.026 (0.4) | 0.026 (0.2) | — | — |
| $CO_2$ | 4.88 (2.4) | 0.02(100ppmv) | 7.04 (53.3) | 1.90 (30.0) | 7.12 (41.4) | 7.22 (42.0) | 5.04 (54.1) |
| COS | 0.07(350ppmv) | $4.10^{-3}$(20ppmv) | 0.07 (0.5) | 0.01 (0.2) | 0.06 (0.3) | 0.008(500ppmv) | 0.008 (900ppmv) |
| $H_2O$ | 1.18 (0.6) | 1.08 (0.6) | 0.67 (5.1) | 1.65 (26.0) | 2.38 (13.8) | 2.33 (13.6) | 0.69 (7.4) |
| $N_2$ | 116.29 (58.2) | 116.26 (60.0) | 0.04 (0.3) | 2.70 (42.6) | 3.52 (20.5) | 3.52 (20.5) | 3.52 (37.8) |
| Other components | 76.28 (38.1) | 76.24 (39.4) | 0.02 (0.2) | 0.00 (0.0) | 0.14 (0.8) | 0.06 (0.3) | 0.06 (0.6) |
| Total | 200.00(100.0) | 193.60(100.0) | 13.20(100.0) | 6.34(100.0) | 17.21(100.0) | 17.18(100.0) | 9.32(100.0 |

*$H_2S/CO_2$-ratio = 0.28
**$H_2S/CO_2$-ratio = 0.77

We claim as our invention:

1. A process for the treatment of a gas containing carbon dioxide, hydrogen sulfide, and organic sulfur compounds, the gas having a relatively high carbon dioxide content in relation to the hydrogen sulfide present, comprising
   (a) introducing the gas into a first absorption zone where it is countercurrently contacted with a regenerable absorption liquid supplied to said zone to remove hydrogen sulfide and organic sulfide compounds under conditions which are nonselective or slightly selective in respect of the co-absorption of carbon dioxide, said first absorption zone being divided into at least two sections arranged one above the other and the gas being introduced into the lowest of the sections and the absorption liquid being supplied to an upper section, the absorption liquid being intermediately cooled outside the absorption zone before being supplied from an upper section to a lower section;

(b) passing the treated gas from the absorption zone and passing the regenerable absorption liquid, loaded with hydrogen sulfide, organic sulfur compounds, and carbon dioxide from the lower section of the absorption zone to a regeneration zone, and regenerating the absorption liquid by heating and/or stripping to yield a gas mixture containing hydrogen sulfide, oganic sulfur compounds, carbon dioxide, and a regenerated absorption liquid, a portion of which is supplied to an upper section of the first absorption zone, and a portion of which is supplied to a second absorption zone;

(c) passing a portion of the gas mixture obtained in step (b) to a catalytic reduction zone in which sulfur compounds other than hydrogen sulfide are converted into hydrogen sulfide at temperatures between 180° and 450° C. in the presence of hydrogen and/or carbon monoxide over a catalyst suitable therefor, and passing the rest of said gas mixture to a sulfur recovery unit, and converting the hydrogen sulfide in the mixture to sulfur with recovery of the resultant sulfur and an offgas;

(d) passing the off-gas from the sulfur recovery unit to the said catalytic reduction zone in order to convert into hydrogen sulfide any remaining sulfur compounds;

(e) passing the combined gas mixture leaving the catalytic reduction zone and containing substantially hydrogen sulfide to a second absorption zone and contacting said combined gas mixture at a temperature below the dew point of water with the same regenerable absorption liquid as used in the first absorption zone, under operating conditions which are selective in respect of the co-absorption of carbon dioxide;

(f) discharging the unabsorbed portion of the combined gas mixture from step (d) and passing the absorption liquid substantially loaded with hydrogen sulfide at least partly to the upper section of the first absorption zone.

2. The process of claim 1 in which the regenerated absorption liquid is introduced at the top of the upper section of the first absorption zone in step (b), and the absorption liquid loaded substantially with hydrogen sulfide is introduced into the bottom of the said upper section in step (f).

3. The process of claim 1 in which the absorption liquid in step (a) is intermediately cooled to a temperature between 20° and 70° C.

4. The process of claim 3 in which the absorption liquid in step (a) is discharged for intermediate cooling from the first absorption zone at a point between the fifth and the fifteenth contact layer in an absorption zone which has ten to fifty contact layers.

5. The process of claim 4 in which the regenerable absorption liquid is an aqueous solution of a weak base having a $pK_b$ of 3 to 8 at 25° C. in a quantity of 10 to 70 percent by weight and sulfolane and/or its derivatives in a quantity of 25 to 70 percent by weight.

6. The process of claim 5 in which the weak base is selected from diethyl monoethanolamine, methyl diethanolamine, di-isopropanolamine, or a mixture thereof.

7. The process of claim 6 in which the gas which has a relatively high carbon dioxide content in relation to hydrogen sulfide and which also contains organic sulfur compounds has a calculated $H_2S/CO_2$ ratio of less than 1.

8. The process of claim 7 in which the calculated $H_2S/CO_2$ ratio is between 0.9 and 0.0001.

9. A process for the treatment of a gas containing carbon dioxide, hydrogen sulfide, and organic sulfur compounds, the gas having a relatively low content of said gases, but a relatively high carbon dioxide content in relation to the hydrogen sulfide present, comprising (a) introducing the gas into a first absorption zone where it is countercurrently contacted with a regenerable absorption liquid supplied to said zone to remove hydrogen sulfide and organic sulfur compounds under conditions which are nonselective or slightly selective in respect to the co-absorption of carbon dioxide;

(b) passing the treated gas from the first absorption zone and passing the regenerable absorption liquid, loaded with hydrogen sulfide, organic sulfur compounds, and carbon dioxide from the lower section of the absorption zone to the upper section of a second absorption zone divided into at least two sections arranged one above the other, absorption liquid being supplied to a lower section, the absorption liquid being intermediately cooled outside the second absorption zone before being supplied from the upper section to a lower section, gas mixture being contacted at a temperature below the dew point of water with the same regenerable absorption liquid as used in the first absorption zone, under operating conditions which are selective in respect of the co-absorption of carbon dioxide;

(c) removing the unabsorbed portion of the combined gas mixture from step (b) and passing the absorption liquid substantially loaded with hydrogen sulfide to a regeneration zone;

(d) regenerating the loaded absorption liquid in the regeneration zone by heating and/or stripping to yield a gas mixture containing hydrogen sulfide, organic sulfur compounds, carbon dioxide, and a regenerated absorption liquid, a portion of which is supplied to an upper section of the first absorption zone, a portion of which is supplied to the upper portion of the second absorption zone;

(e) passing a portion of the gas mixture obtained in step (d) to a catalytic reduction zone in which sulfur compounds other than hydrogen sulfide are converted into hydrogen sulfide at temperatures between 180° and 450° C. in the presence of hydrogen and/or carbon monoxide over a catalyst suitable therefor, and passing the rest of said gas mixture to a sulfur recovery unit and converting the hydrogen sulfide in the mixture to sulfur with recovery of the resultant sulfur and an off gas;

(f) passing the off-gas from the sulfur recovery unit to the said catalytic reduction zone in order to convert into hydrogen sulfide any remaining sulfur compounds;

(g) passing the combined gas mixture leaving the catalytic reduction zone and containing substantially hydrogen sulfide to the lower portion of the second absorption zone, and utilizing the combined gas mixture as the gas mixture of step (b).

10. The method of claim 9 wherein the unabsorbed portion of the combined gas mixture from step (f) is introduced into the upper section of the first absorption zone and contacted with the regenerable absorbent to remove the residual sulfur compounds in the said mixture.

* * * * *